US011956683B2

(12) United States Patent
Awada et al.

(10) Patent No.: US 11,956,683 B2
(45) Date of Patent: Apr. 9, 2024

(54) ROBUST BEAM FAILURE RECOVERY USING A NON-SERVING CELL

(71) Applicant: Nokia Technologies Oy, Espoo (FI)

(72) Inventors: Ahmad Awada, Munich (DE); Timo Koskela, Oulu (FI); Jorma Kaikkonen, Oulu (FI); Ingo Viering, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 354 days.

(21) Appl. No.: 17/602,938

(22) PCT Filed: Apr. 29, 2020

(86) PCT No.: PCT/IB2020/054050
§ 371 (c)(1),
(2) Date: Oct. 11, 2021

(87) PCT Pub. No.: WO2020/222144
PCT Pub. Date: Nov. 5, 2020

(65) Prior Publication Data
US 2022/0174567 A1    Jun. 2, 2022

Related U.S. Application Data

(60) Provisional application No. 62/842,177, filed on May 2, 2019.

(51) Int. Cl.
*H04W 36/08*    (2009.01)
*H04B 7/06*    (2006.01)
(Continued)

(52) U.S. Cl.
CPC .......... *H04W 36/08* (2013.01); *H04B 7/0695* (2013.01); *H04W 36/0058* (2018.08);
(Continued)

(58) Field of Classification Search
None
See application file for complete search history.

(56) References Cited

U.S. PATENT DOCUMENTS 10,798,732 B2 * 10/2020 Park ...................... H04W 72/29
11,228,974 B2 *  1/2022 Park .................. H04W 52/0209
(Continued)

FOREIGN PATENT DOCUMENTS

WO    2019/032017 A1    2/2019

OTHER PUBLICATIONS

"New WID: NR mobility enhancements", 3GPP TSG RAN Meeting #80, RP-181351, Agenda: 9.1.10, Intel Corporation, May 21-25, 2018, 5 pages.
"Lower-layer mobility enhancements", 3GPP TSG-RAN WG1 Meeting #96, R1-1902528, Agenda: 7.2.12.1, Ericsson, Feb. 25-Mar. 1, 2019, pp. 1-8.
"3rd Generation Partnership Project; Technical Specification Group Radio Access Network, NR; Radio Resource Control (RRC) protocol specification (Release 15)", 3GPP TS 38.331, V15.5.1, Apr. 2019, pp. 1-491.
(Continued)

*Primary Examiner* — Clemence S Han
(74) *Attorney, Agent, or Firm* — Robert P. Michal, Esq.; Carter, DeLuca & Farrell LLP

(57) ABSTRACT

A UE, in response to a beam failure being detected for a serving cell that serves the user equipment, determines whether a timer is running. One of the following is performed by the UE: in response to the timer running, a beam failure recovery procedure with a target non-serving cell; or in response to the timer not running, a beam failure recovery procedure with the serving cell. Methods, apparatus, computer programs, and computer program products are disclosed.

6 Claims, 4 Drawing Sheets

(51) Int. Cl.
*H04W 36/00* (2009.01)
*H04W 36/30* (2009.01)
*H04W 36/32* (2009.01)
*H04W 76/19* (2018.01)

(52) U.S. Cl.
CPC ... *H04W 36/00837* (2018.08); *H04W 36/305* (2018.08); *H04W 36/32* (2013.01); *H04W 76/19* (2018.02)

(56) References Cited

U.S. PATENT DOCUMENTS

| | | | |
|---|---|---|---|
| 2015/0271717 | A1 | 9/2015 | Moon et al. |
| 2019/0052342 | A1 | 2/2019 | Maattanen et al. |
| 2019/0089579 | A1* | 3/2019 | Sang ............ H04W 40/16 |
| 2019/0246442 | A1* | 8/2019 | Park ............ H04W 72/23 |
| 2019/0253949 | A1* | 8/2019 | Park ............ H04W 36/0077 |
| 2019/0387440 | A1* | 12/2019 | Yiu ............ H04W 36/165 |
| 2020/0107235 | A1* | 4/2020 | Peisa ............ H04B 7/0617 |
| 2020/0374960 | A1* | 11/2020 | Deenoo ............ H04W 76/16 |
| 2021/0195674 | A1* | 6/2021 | Park ............ H04L 1/0026 |
| 2021/0195675 | A1* | 6/2021 | Park ............ H04W 88/14 |
| 2022/0104300 | A1* | 3/2022 | Ramachandra ...... H04B 7/0695 |
| 2022/0131793 | A1* | 4/2022 | Ramachandra ..... H04W 36/305 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.5.1, Apr. 2019, pp. 1-948.

International Search Report and Written Opinion received for corresponding Patent Cooperation Treaty Application No. PCT/IB2020/054050, dated Jul. 22, 2020, 16 pages.

"The Necessity of T312 in NR", 3GPP TSG-RAN WG2 #103bis, R2-1815359, Agenda: 10.4.1.3.11, Samsung, Oct. 8-12, 2018, 18 pages.

"Considerations for failure recovery in NR", 3GPP TSG-RAN WG2 Meeting #105bis, R2-1904289, Agenda: 11.9.3, Nokia, Apr. 8-12, 2019, 4 pages.

"Faster Handover Failure Recovery", 3GPP TSG-RAN WG2 Meeting #105, R2-1900921, Agenda: 11.9.3, ETRI, Feb. 25-Mar. 1, 2019, 3 pages.

Office action received for corresponding European Patent Application No. 20724211.6, dated Feb. 24, 2023, 5 pages.

* cited by examiner

ROBUST BEAM FAILURE RECOVERY USING A NON-SERVING CELL

RELATED APPLICATION

This application claims priority to PCT Application No. PCT/IB2020/054050, filed on Apr. 29, 2020, which claims priority to U.S. Application No. 62/842,177, filed on May 2, 2019, each of which is incorporated herein by reference in its entirety.

TECHNICAL FIELD

This invention relates generally to mobility procedures for handovers of user equipment in wireless networks and, more specifically, relates to beam failure recovery in a non-serving cell.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

One of the main objectives of the New Radio (NR) Work Item (WI) on mobility enhancements for Rel. 16 is to study and specify solutions for fast handover failure recovery. See Intel Corporation, "New WID: NR mobility enhancements", RP-181351, 3GPP TSG RAN Meeting #80, La Jolla, USA, May 21-May 25, 2018. One of the objectives of this WI is the following:

"To study solution(s) to improve HO/SCG change reliability and robustness especially considering challenges in high/med frequency focusing on the following identified solutions but not limited.
Conditional handover
Fast handover failure recovery"

Thus, solutions are to be studied that improve Hand Over (HO) or Secondary Cell Group (SCG) change reliability and robustness. One area for improvement is triggering of a Beam Failure Recovery (BFR) procedure, which is initiated upon the User Equipment (UE) detecting beam failure.

BRIEF SUMMARY

This section is intended to include examples and is not intended to be limiting.

In an exemplary embodiment, a method is disclosed that includes determining, by a user equipment and in response to a beam failure being detected for a serving cell that serves the user equipment, whether a timer is running. The method also includes performing one of the following by the user equipment: in response to the timer running, a beam failure recovery procedure with a target non-serving cell; or in response to the timer not running, a beam failure recovery procedure with the serving cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus to perform operations comprising: determining, by a user equipment and in response to a beam failure being detected for a serving cell that serves the user equipment, whether a timer is running; and performing one of the following by the user equipment: in response to the timer running, a beam failure recovery procedure with a target non-serving cell; or in response to the timer not running, a beam failure recovery procedure with the serving cell.

An exemplary computer program product includes a computer-readable storage medium bearing computer program code embodied therein for use with a computer. The computer program code includes: code for determining, by a user equipment and in response to a beam failure being detected for a serving cell that serves the user equipment, whether a timer is running; and code for performing one of the following by the user equipment: in response to the timer running, a beam failure recovery procedure with a target non-serving cell; or in response to the timer not running, a beam failure recovery procedure with the serving cell.

In another exemplary embodiment, an apparatus comprises: means for determining, by a user equipment and in response to a beam failure being detected for a serving cell that serves the user equipment, whether a timer is running; and means for performing one of the following by the user equipment: in response to the timer running, a beam failure recovery procedure with a target non-serving cell; or in response to the timer not running, a beam failure recovery procedure with the serving cell.

DETAILED DESCRIPTION OF THE DRAWINGS

Figure 1:
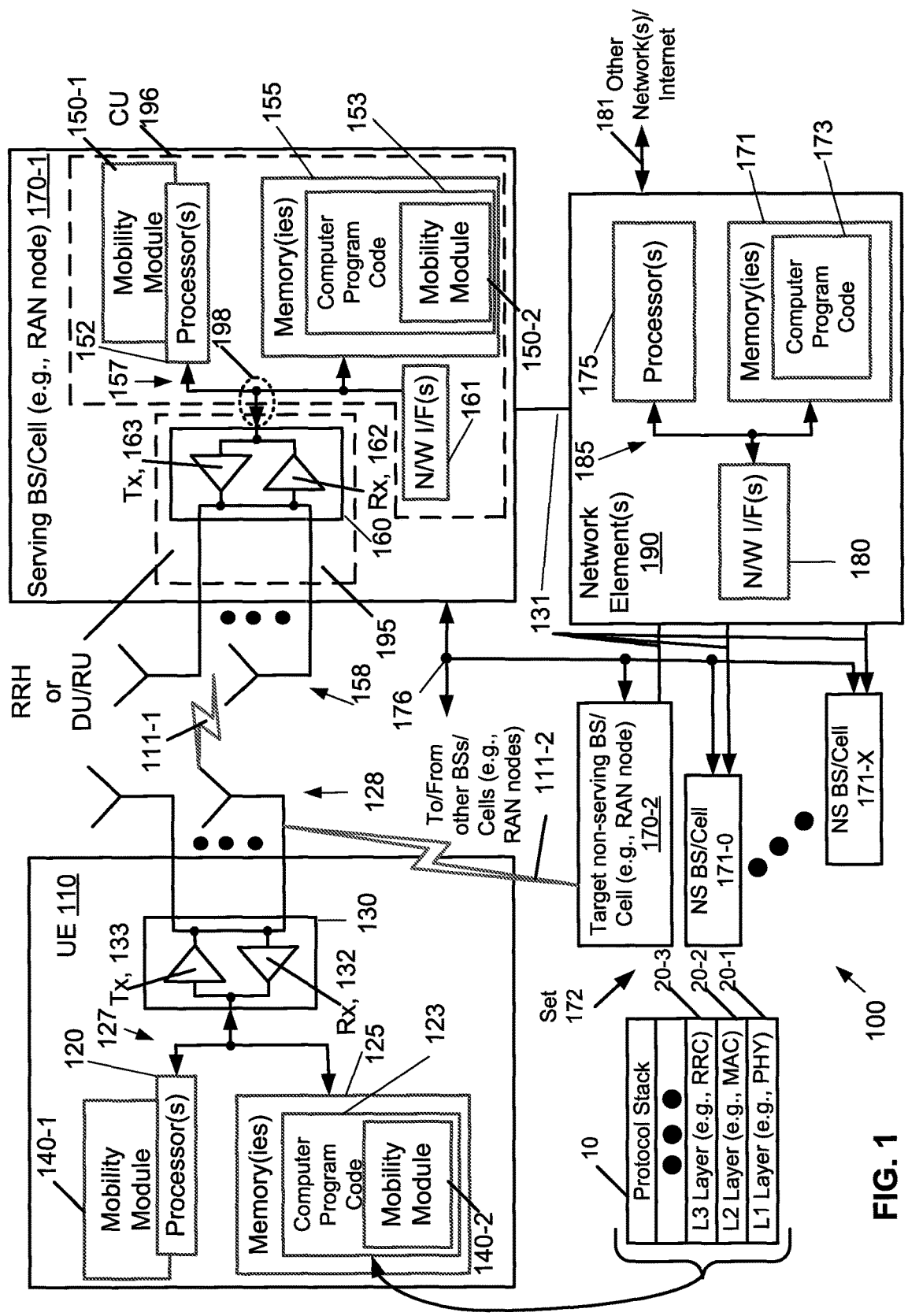
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
BFD-RS beam failure detection reference signal BFR beam failure recovery
BFRR beam failure recovery request
BFI beam failure instance
BLER block error rate
BS base station
CBRA contention based random access
CE control element
CFRA contention-free random access
CORESET control resource set
C-RNTI cell radio network temporary identifier
CSI-RS channel state information-reference signal
CU central unit
DMRS demodulation reference signals
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
MR measurement report
NS non-serving
HO handover
I/F interface
L1 a first (e.g., lowest) layer in a protocol stack, e.g., a physical layer, PHY
L2 a second (higher) layer in a protocol stack, e.g., MAC, RLC, and/or PDCP
L3 a third (higher) layer in a protocol stack, e.g., RRC, Non-Access Stratum, and/or Internet Protocol
LTE long term evolution
MAC medium access control, also a layer in a protocol stack
MME mobility management entity
ng or NG next generation
ng-eNB or NG-eNB next generation eNB
NR new radio
N/W or NW network
OOS out of synchronization
PCI physical cell identity
PDCCH physical downlink control channel
PDCP packet data convergence protocol
PHY physical layer
PRACH physical random access channel
RAN radio access network
QCL'd quasi co-located
RA-RNTI random access radio network temporary identifier
Rel release
RLC radio link control
RLF radio link failure
RRH remote radio head
RRC radio resource control
RS reference signal
RU radio unit
Rx or RX receiver or reception
SCG secondary cell group
SDAP service data adaptation protocol
SGW serving gateway
SMF session management function
SSB SS/PBCH block
SS/PBCH synchronization signal/physical broadcast channel
TCI transmission configuration indication
TS technical specification
TTT time-to-trigger
Tx or TX transmitter or transmission
UE user equipment (e.g., a wireless, typically mobile device)
UPF user plane function
WI work item The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe procedures for robust beam failure recovery using a non-serving cell. Additional description of these techniques is presented after a system into which the exemplary embodiments may be used is described.

Turning to FIG. 1, this figure shows a block diagram of one possible and non-limiting exemplary system in which the exemplary embodiments may be practiced. A serving Base Station (BS) or cell 170-1, target non-serving BS or cell 170-2, and network element(s) 190 are illustrated as part of a wireless communication network 100. In FIG. 1, a user equipment (UE) 110 is in wireless communication with the wireless communication network 100.

A UE is a wireless, typically mobile device that can access a wireless communication network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a mobility module 140, comprising one of or both parts 140-1 and/or 140-2, which may be implemented in a number of ways. The mobility module 140 may be implemented in hardware as mobility module 140-1, such as being implemented as part of the one or more processors 120. The mobility module 140-1 may be implemented also as an integrated circuit or through other hardware such as a programmable gate array. In another example, the mobility module 140 may be implemented as mobility module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with the serving BS/cell 170-1 via a wireless link 111-1 and communicates with the target non-serving BS/cell 170-2 via a wireless link 111-2.

Note that there could also be zero, one, or more non-serving (NS) BSs/cells 171. If there are one or more of the non-serving BSs/cells, the set 172 of non-serving cells includes the target non-serving BS/cell 170-2 and the X non-serving BS/cells 171, where X is one or more. The target non-serving BS/cell 170 is the non-serving cell in the set 172 that meets, e.g., criteria for handover.

There is also a protocol stack 10 shown in the UE 110, and implemented in the computer program code 123 (although alternatively or in addition, the protocol stack 10 could also be implemented in the one or more processors 120). The protocol stack 10 has a number of layers 20: L1 20-1, a first (e.g., lowest) layer, e.g., a physical layer (PHY); L2 20-2, second (higher) layer, e.g., MAC, RLC, and/or PDCP; L3 20-3, a third (higher) layer, e.g., RRC, Non-Access Stratum, and/or Internet Protocol; and other layer(s). This type of protocol stack 10 is well known.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances (including Internet of Things devices) permitting wireless Internet access and possibly browsing, tablets with wireless communication capabilities, as well as portable units or terminals that incorporate combinations of such functions.

Each BS/cell 170 provides access by wireless devices such as the UE 110 to the wireless communication network 100. Each BS/cell 170 provides at least one cell and may provide multiple cells. A cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells. Therefore, when discussing the serving BS/cell 170-1 and the non-serving BS/cell 170-2, these could be two different cells from the same base station, or two different cells from two different base stations.

As used herein, a serving cell is a cell to which the UE 110 is exchanging user data, i.e., receiving/transmitting from/to a cell. By contrast, a non-serving cell could be, for instance, one of the following.

1) A cell which the UE is not connected to and is not prepared beforehand, i.e., the cell does not have the UE context (relevant information about the UE with respect to configuration, capability, history, and the like).
2) A cell which the UE is not connected to but is prepared, i.e., the cell does have the UE context. Herein, the non-serving cell could be prepared beforehand/proactively by the serving cell.
3) A cell which the UE is connected to but not exchanging any user data with. This may correspond to a multi-connectivity scenario, where the UE is connected to multiple cells but served only by one or subset of them at a time.

The two BSs/cells 170 are assumed to be similar, and only examples of the circuitry in the serving BS/cell 170-1 will be described. The BS/cell 170 may be, for instance, a base station for 5G, also called New Radio (NR), which uses the term "RAN nodes" to refer to base stations. In 5G, the BS/cell 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the BS/cell 170 and centralized elements of the BS/cell 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The BS/cell 170 may also be an eNB (evolved NodeB) base station, for LTE (long term evolution), or any other suitable base station. For an eNB, this might use a Remote Radio Head (RRH), also illustrated as reference 195.

The BS/cell 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The BS/cell 170 includes a mobility module 150, comprising one of or both parts 150-1 and/or 150-2, which may be implemented in a number of ways. The mobility module 150 may be implemented in hardware as mobility module 150-1, such as being implemented as part of the one or more processors 152. The mobility module 150-1 may be implemented also as an integrated circuit or through other hardware such as a programmable gate array. In another example, the mobility module 150 may be implemented as mobility module 150-2, which is implemented as computer program code 153 and is executed by the one or more processors 152. For instance, the one or more memories 155 and the computer program code 153 are configured to, with the one or more processors 152, cause the BS/cell 170 to perform one or more of the operations as described herein. Note that the functionality of the mobility module 150 may be distributed, such as being distributed in NR between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the BS/cell 170 possibly being physically in a different location from the RRH/DU, and the one or more buses 157 could be implemented in part as, e.g., fiber optic cable or other suitable network connection to connect the other elements (e.g., a central unit (CU), gNB-CU) of the BS/cell 170 to the RRH/DU 195. Reference 198 also indicates those suitable network link(s).

The wireless communication network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The BSs/cells 170 are coupled via links 131 to a network element (or elements) 190. The links 131 may be implemented as, e.g., an NG interface for 5G, or an S1 interface for LTE, or other suitable interface for other standards. The network element(s) 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless communication network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, BSs/cells 170, and other functions as described herein.

Having thus introduced one suitable but non-limiting technical context for the practice of the exemplary embodiments of this invention, the exemplary embodiments will now be described with greater specificity.

The network configures the UE 110 with set of reference signals for monitoring the quality of the radio link (e.g., wireless link 111). Note that the "network" refers at least to a BS/cell 170 interacting with the UE 110 via a wireless link 111, but may also include one or more network elements 190. This set of reference signals may be referred as q0 or Beam Failure Detection Reference Signal (BFD-RS). Typically, BFD-RS(s) are configured to be spatially Quasi Co-Located (QCL'd) with PDCCH Demodulation Reference Signal (DMRS), i.e., these reference signals correspond to downlink beams used to transmit PDCCH. Downlink beams are identified by reference signal, either SS/PBCH block index or CSI-RS resource index. The network may configure the BFD-RS list using RRC signaling or with combined RRC+MAC Control Element (CE) signaling.

When the UE is not explicitly configured with a BFD-RS list, the UE determines the BFD-RS resources implicitly based on the configured/indicated/activated PDCCH-TCI states per CORESET, i.e., the downlink reference signals (CSI-RS, SS/PBCH block) that are spatially QCL'd with PDCCH DMRS, or, in other words, PDCCH beams.

The physical layer 20-1 assesses the quality of the radio link (based on BFD-RS in the set of q0) periodically. Assessment is performed per BFD-RS and when the radio link condition of each BFD-RS in the beam failure detection set is considered to be in failure condition, e.g., the hypothetical PDCCH BLER estimated using the Reference Signal (RS) is above the configured threshold, a beam failure instance (BFI) indication is provided to a higher layer (e.g., MAC layer 20-2). One example of BLER threshold value may be the out of sync (synchronization) (OOS) threshold used for radio link monitoring which corresponds to 10% BLER. Evaluation and indication are performed periodically.

In case the at least one BFD-RS is not in a failure condition, no indication is provided to a higher layer. Meanwhile, the MAC layer 20-2 implements a counter to count the BFI indications from the PHY layer and if the BFI counter reaches a maximum value (configured by the network), a beam failure is declared. This counter can be configured to be supervised by a timer: each time the MAC layer receives a BFI indication from a lower layer, a timer is started. Once the timer expires, the BFI counter is reset (counter value is set to zero).

The network may provide the UE with a list of candidate RSs for recovery that can be indicated using a dedicated signal. Candidate beam L1-RSRP measurements may be provided to the MAC layer, which performs the selection of a new candidate beam and determines the uplink resources to indicate the new candidate to the network. The network may configure the UE with dedicated signaling resources (e.g., PRACH resources) that are candidate beam specific. That is, the UE can indicate a new candidate beam by sending a preamble.

A beam failure recovery procedure is initiated if the UE has declared a beam failure and the UE has detected a new candidate beam or new candidate beams based on L1 measurements (e.g., L1-RSRP). A dedicated signal from the PRACH pool, which can be referred to as a BFR resource or a Contention Free Random Access (CFRA) resource, is configured per candidate RS in the Candidate-Beam-RS-List, i.e., it has to be noted that beam recovery procedure differs slightly from Random Access (RA) procedure when it comes to base station (e.g., gNB) response to preamble reception. A specific threshold may be configured such that the UE selects any of the new candidates (based on L1-RSRP measurements) that are above the threshold for beam failure recovery. In case there are no beams above the configured threshold, the UE 110 utilizes contention-based signaling to indicate a new candidate, i.e., Contention Based Random Access (CBRA) preamble resources are mapped to specific downlink RSs.

The UE 110 monitors a network response to a Beam Failure Recovery Request (BFRR) during the beam recovery response window (similar to a RACH Response window) using the same beam alignment (i.e., a same beam direction that was used for TX is used for RX) used for transmitting the recovery signal. The UE expects the network to provide a response using a beam that is spatially QCL'd with the indicated downlink reference signal. A case where this correspondence does not hold is not yet defined.

When CFRA is used for beam recovery purposes, the UE expects the network to respond using C-RNTI instead of RA-RNTI. In case CBRA resources are used, the UE expects a response from the network as normally done in a RACH procedure.

Other considerations include Time-to-Trigger (TTT). The LTE standard supports several parameters to trigger the handover and select the target cells, such as hysteresis margin and TTT. When applying TTT, the handover is initiated only if the triggering requirement is fulfilled for a time interval defined by a value of the TTT. This parameter can decrease the number of unnecessary handovers and effectively avoid Ping-Pong effects, but may also delay the handover which then increases the probability of handover failures.

As additional information concerning handover, the source configures the UE to report measurement either periodically or in an event-triggered manner, i.e., that is only when a condition is fulfilled for some time duration. For intra-frequency handover, typically the A3 measurement event is configured, i.e., UE triggers a report when a neighbor cell becomes offset better than source/serving cell. See, e.g., 3GPP TS 38.331 or 3GPP TS 36.331.

Each measurement event has an entering condition and a leaving condition. In case of the A3 event:

Entering condition: Mn+Ocn>Ms+Off+Hyst; and
Leaving condition: Mn+Ocn<Ms+Off−Hyst,
where:
Ms: Measurement of serving cell (L3 filtered);
Mn: Measurement of neighboring cell (L3 filtered);
Ocn: Cell specific offset that can be configured differently for different neighboring cells;
Off: Offset for handover; and
Hyst: Hysteresis.

If the entering condition is fulfilled for the first time, the UE starts a timer with a TTT value. If the timer for TTT expires, the UE sends a measurement report to the source cell, and this may start a process leading to handover. The timer for TTT is stopped only if the leaving condition is met. In this case, the UE does not send any measurement report, as the timer of TTT did not expire.

One possible straightforward technique for the problem of beam failure recovery that has been examined, is that the UE checks the L1 beam measurements of the source cell and potential target non-serving cell. For instance, in an intra-frequency scenario (e.g., mobility in connected mode between two different cells, but within a same frequency), if the strongest L1 beam measurement of the source cell is weaker than that of the target cell by some offset, the UE triggers beam failure recovery to another non-serving cell.

This procedure may restrict the cases when beam failure recovery is triggered in a non-serving cell but does not necessarily reduce the unnecessary replacement of the serving eNB or target cell access failures. This is because L1 measurements are subject to fast fading fluctuations and measurement errors and are not stable enough to use to make a reliable decision on triggering of beam failure recovery in another serving cell. As a consequence, this may lead to a cell change following fast fading and measurement errors. This needs to be avoided because of "false alarm" which may lead to a quick handover back to the source cell or even a failure in the target cell.

T312 has been introduced for declaring an early the RLF and initiating the RRC re-establishment procedure in L3. The network can configure T312 for a certain measurement event X. Timer T312 starts if a measurement report is triggered from a measurement event X while timer T310 is running. If timer T312 expires, the UE declares an RLF and initiates an RRC re-establishment procedure. In current 3GPP specifications, timer T312 is only started when T310 is already running, but proposals have been already discussed to start timer T312 with the triggering of measurement report irrespective of T310.

The exemplary embodiments are based on the assumption that if the target cell is stable enough, then it is very likely that an RRC measurement event has been triggered shortly beforehand (e.g., but the report based on the measurement event probably got lost). Otherwise, if no measurement report has been triggered beforehand, it is likely that the target cell is not stable enough, and BFR to this neighbor is risky and may lead to failure or a handover back to the serving cell.

As described above, TTT is used for triggering a measurement report for handover. The TTT is also used herein, so that the beam failure recovery to another cell is allowed only if a measurement report has been triggered using TTT. Consequently, there is an interaction herein between the measurement report used for L3 inter-cell mobility and beam failure recovery in a non-serving cell.

An exemplary embodiment proposes the following procedure for triggering beam failure recovery in non-serving cell.

1) When a measurement event, for which a timer T is configured, triggers a measurement report, the timer T is started.

The entering condition of the measurement reporting event may be evaluated using, e.g., the L3 filtered cell quality of the target cell. This quality is currently derived as an average of the N strongest beam measurements above a threshold (or if no beams are above the threshold, UE uses the best beam).

The measurement report may be triggered when the entering condition is fulfilled for a certain Time-to-Trigger (TTT) or when the timer for TTT expires. That is, from an implementation point of view, the measurement report is sent only if the timer for TTT expires. This happens only if the entering condition has been fulfilled at least once and after that, the leaving condition was never fulfilled, such that the timer TTT expires.

2) If beam failure has been detected while timer T is running, the UE is allowed to initiate beam failure recovery to a strongest non-serving cell or any cell that has fulfilled the criteria for starting the timer T. Otherwise, the UE 110 should only perform beam failure recovery in the same serving cell.

In some embodiments, the UE may be provided with an alternative set of SSB/CSI-RS candidates for BFR (including other configuration) that are applied when timer T is running. That is the set of SSB/CSI-RS candidates for BFR (e.g., including other configuration) that is applied when timer T is running can be different from the set that can be used by the UE before timer T is started. For instance, the set of SSB/CSI-RS candidates for BFR before timer T is started contains only candidates from the serving cell, and while timer T is running, the set contains SSB/CSI-RS candidates from both serving (e.g., source) and target cells. Alternatively, before timer T is started, the configured set of SSB/CSI-RS candidates for BFR may comprise candidates from both the source and target cell, and while timer T is running the set contains SSB/CSI-RS candidates from the target cell only.

3) If timer T expires, the UE performs beam failure recovery in the same serving cell where a beam failure was detected.

In this latter case, it cannot any longer be assumed that the radio conditions of the target cell are stable enough and/or will still fulfill the entering condition of the measurement event triggering the report. This ends the example of the method.

Unlike conventional techniques, the UE is allowed to initiate the MAC beam failure recovery procedure to a non-serving cell in response to the L3 condition for RRC inter-cell mobility being fulfilled. This ensures that the beam failure recovery is triggered when the radio link of the source cell is no longer sufficient and the radio link quality of the target non-serving cell is stable enough to continue serving the UE once the UE has been handed over to the non-serving cell.

When the MAC layer (e.g., 20-2 in FIG. 1) in the UE 110 detects beam failure, the MAC layer 20-2 may trigger failure indication to a higher layer (e.g., layer 20-3) to indicate that the MAC layer 20-2 has detected a beam failure.

This enables the RRC layer 20-3 to check if the timer T is running for any of the cells. If beam failure indication is received while timer T is running, the RRC layer 20-3 may command the MAC layer 20-2 to initiate beam failure recovery to a specific target cell that has fulfilled the entering condition of the measurement event associated with timer T. If the RRC layer 20-3 does not perform any actions upon receiving the indication from the MAC layer 20-2, the UE 110 performs beam recovery for the serving cell as is normally performed according to what was described above.

In one further option, the MAC layer 20-2 may indicate to a higher layer (e.g., 20-3) that the beam failure has been detected and no serving cell CFRA candidates were above threshold. This may delay the indication until the CFRA candidates are evaluated.

Figure 2:
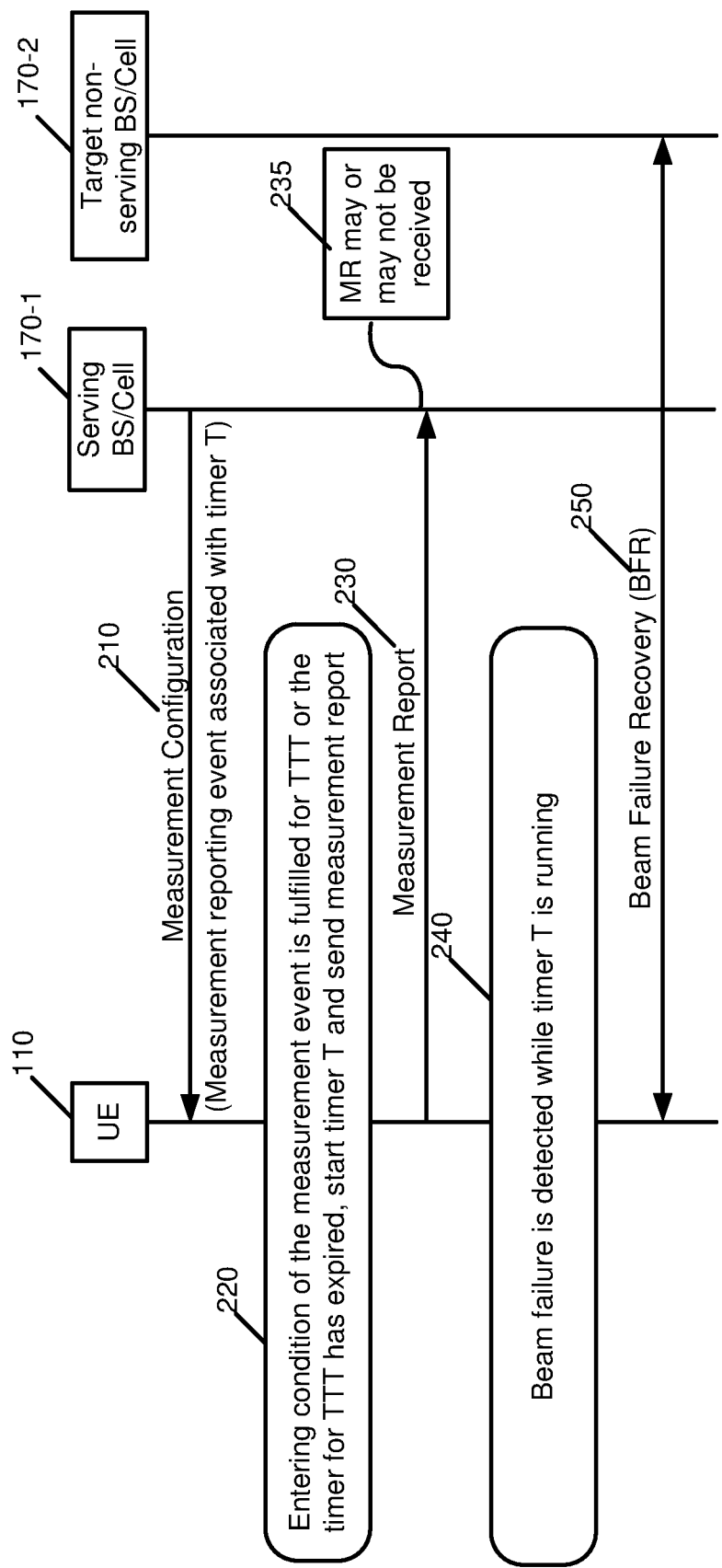
FIG. 2 describes an exemplary signaling diagram for a case when beam failure has been detected while timer T is running.

FIG. 2 describes an exemplary signaling diagram for a case when beam failure has been detected while timer T is running. In this example, the serving BS/cell 170-1 signals a measurement configuration message 210, which comprises a measurement reporting event associated with timer T. In block 220, the UE 110 determines an entering condition of the measurement event is fulfilled for time-to-trigger (TTT) or the timer for TTT has expired. That is, the non-serving BS/cell 170-2 now meets criteria making this cell a possible HO candidate. It is noted that the measurement configuration may have a white list or black list of cells to consider in the measurement and, further, it may happen that more than a cell meets the criteria (not a common case though). Both of these may be taken into account if necessary. The UE 110 starts the timer T and signals the measurement report 230. As stated in block 235, the serving BS/cell 170-1 may or may not receive the measurement report (MR) 230. That is, FIG. 2 shows that the measurement report is sent by the UE but does not indicate whether the measurement is successfully received by the source cell. It can happen that such measurement report is lost. Instead of declaring a radio link failure upon detection of radio link failure, e.g., due to the expiry of timer T310, the UE 110 can perform a beam failure recovery to another cell prior to expiration of the timer T, as illustrated in FIG. 2. For instance, the UE 110 detects a beam failure in block 240 while the timer T is running A beam failure recovery procedure 250 is performed between the UE 110 and the target non-serving BS/cell 170-2.

FIG. 2 illustrates one of the examples described above in the overview, where, if the target cell is stable enough, then it is very likely that an RRC measurement event has been triggered shortly beforehand. It is assumed the target non-serving BS/cell 170-2 is therefore suitable for the BFR procedure 250.

Figure 3:
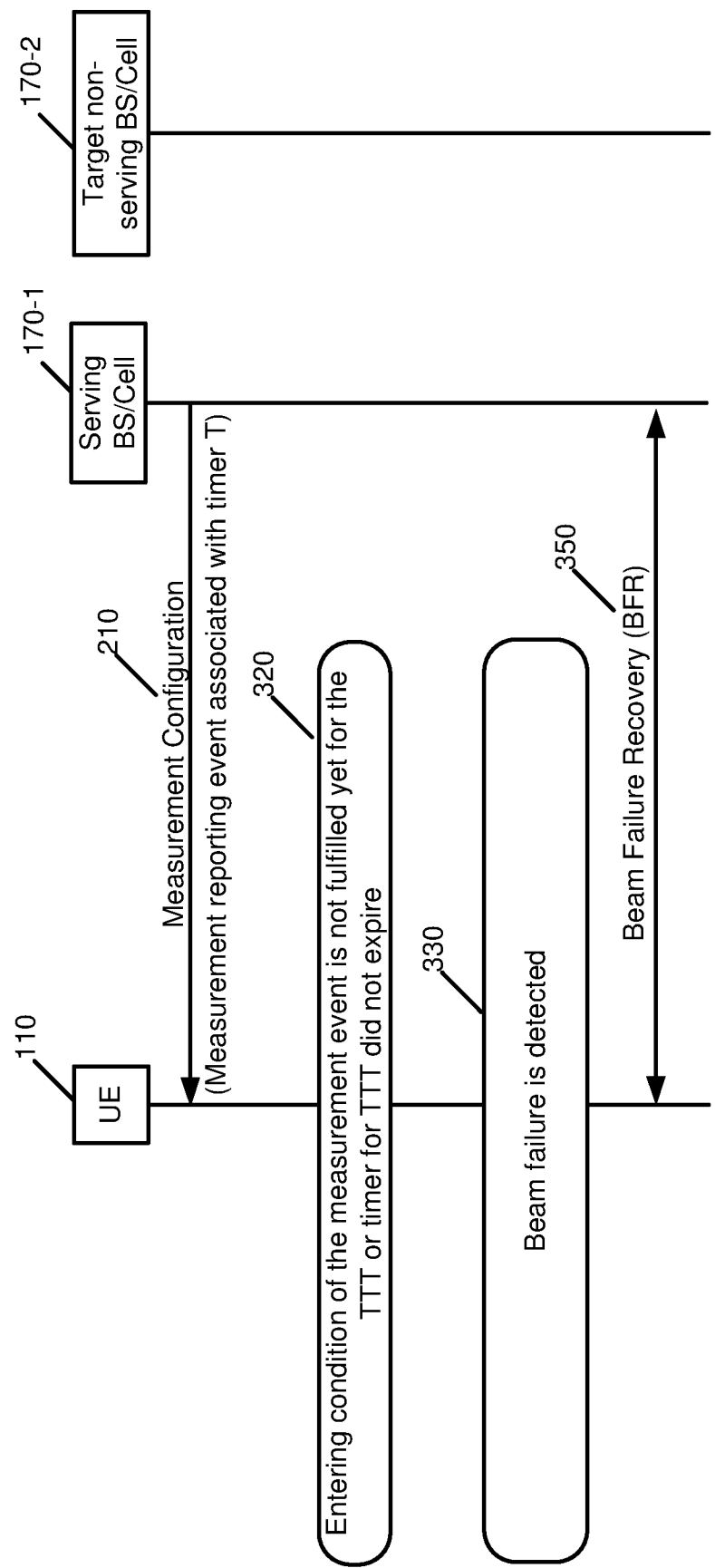
FIG. 3 describes a case when beam failure is detected while the entering condition of the measurement event is being evaluated by the UE or even fulfilled but not for TTT.

Turning to FIG. 3, this figure describes a case when beam failure is detected while the timer T is not running. This may correspond to the case when the entering condition of the measurement is being evaluated by the UE or is even fulfilled but not for TTT. In this case, the timer T is not started and the UE triggers beam failure recovery in the same serving cell. In this example, the serving BS/cell 170-1 signals a measurement configuration message 210, which comprises a measurement reporting event associated with timer T. In block 320, the UE 110 determines an entering condition of the measurement event is not fulfilled yet for the TTT or timer for TTT did not expire. Consequently, no timer T is started. In block 330, the UE 110 detects a beam failure and a beam failure recovery procedure 350 is performed between the UE 110 and the serving BS/cell 170-1.

FIG. 3 illustrates one of the examples described above in the overview provided above, where, if no measurement report has been triggered beforehand, it is likely that the target is not stable enough, and BFR to this neighbor is risky and may lead to failure or a handover back. It is assumed the target non-serving BS/cell 170-2 is therefore not suitable for the BFR procedure 250, and the BFR procedure 350 is instead made back to the serving BS/cell 170-1.

In one embodiment, the existing timer T312 can be reused for the proposed behavior. In an alternative embodiment, the timers/counters related to RLF detection or BFR are adjusted in response to the UE being allowed to perform recovery to the non-serving BS/cell 170-2. That is, while the timer T is running, the UE is allowed to perform beam failure recovery in another cell if a beam failure has been detected in the serving cell and, in this time period, the UE may apply specific values for the timers/counters that are used in RLF detection or BFR in the target cell. For instance, the number of random access trials during BFR or RACH response window can be different for the serving and target cells.

Figure 4:
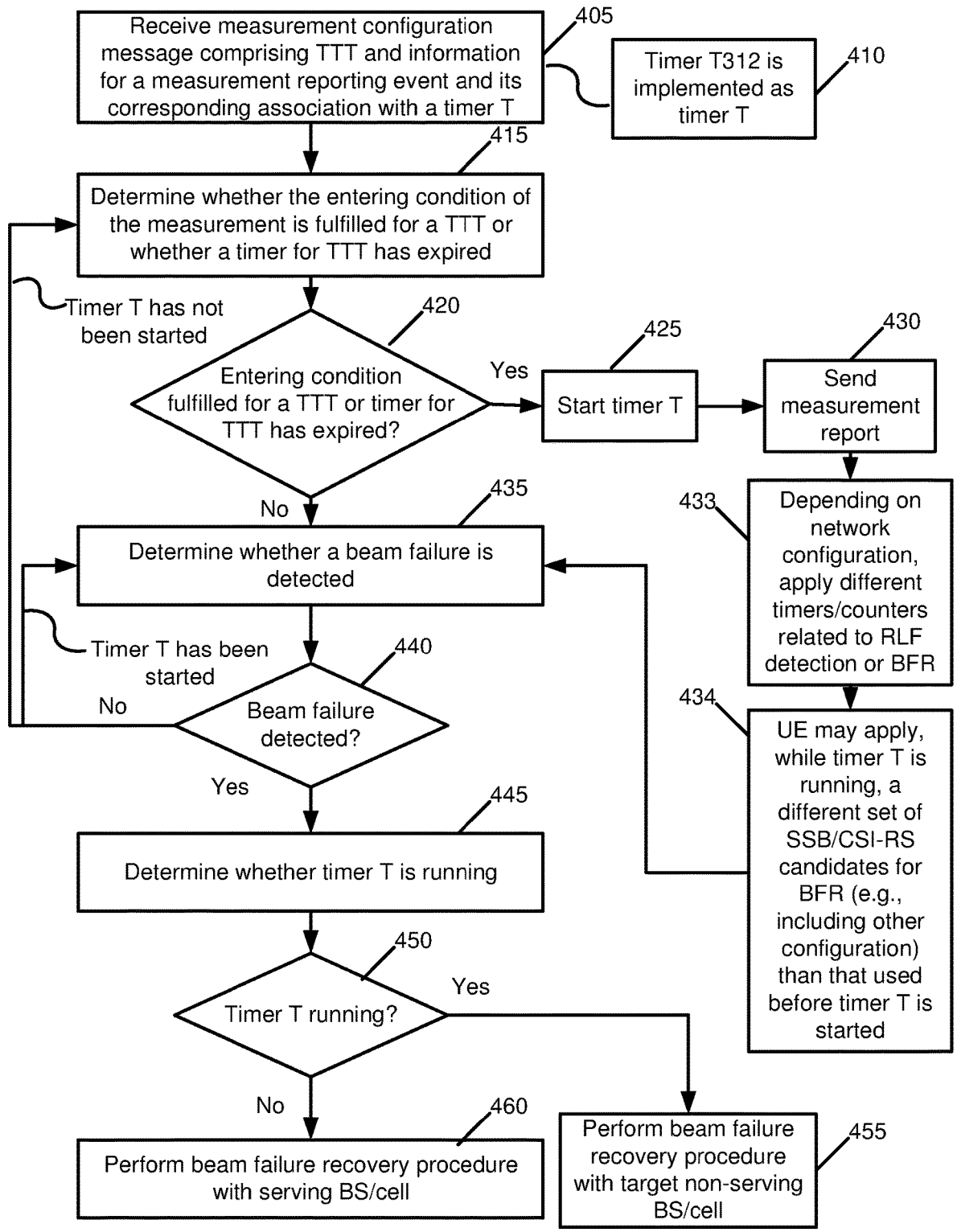
FIG. 4 is a logic flow diagram for an exemplary procedure performed by the UE 110 for robust beam failure recovery using a non-serving cell.

FIG. 4 is a logic flow diagram for an exemplary procedure performed by the UE 110 for robust beam failure recovery using a non-serving cell. This figure illustrates how a UE might implement FIGS. 2 and 3. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the mobility module 140 may include multiples ones of the blocks in FIG. 4, where each included block is an interconnected means for performing the function in the block. The blocks in FIG. 4 are assumed to be performed by the UE 110, e.g., under control of the mobility module 140 at least in part.

In block 405, the UE 110 receives the measurement configuration message 210 comprising the TTT and information for a measurement reporting event and its corresponding association with a timer T. That is, the association is provided by the network. Note that only one block is shown, but these may be configured separately, such as the TTT and the information being configured via different signaling at different times. One example of a timer that may be used is timer T312 that is implemented as timer T. See block 410.

In block 415, the UE 110 determines whether the entering condition of the measurement is fulfilled for a TTT or whether a timer for TTT has expired. If the entering condition is fulfilled or the timer for TTT has expired (block 420=Yes), the UE 110 starts the timer T in block 425 and in block 430 sends the measurement report 230, and the flow proceeds to block 435. Block 433 is an example of another alternative, where, depending on network configuration, different timers/counters related to RLF detection or BFR are applied while timer T is running. Block 434 is an additional alternative, where the UE 110 may apply, while the timer T is running, a different set of SSB/CSI-RS candidates for BFR (e.g., including other configuration) than that used before the timer T is started.

If the entering condition is not fulfilled or the timer for TTT has not expired (block 420=No), the flow proceeds to block 435, where the UE 110 determines whether a beam failure is detected. If a beam failure is not detected (block 440=No), the flow proceeds to block 435 if the timer T has been started (Block 440=No and timer T has been started). Otherwise (Block 440=No and the timer T has not been started), the flow proceeds to block 415.

If a beam failure is detected (block 440=Yes), the UE 110 determines whether timer T is running in block 445. If the timer T is running (block 450=Yes), the UE 110 performs a beam failure recovery procedure (block 455) with the target non-serving BS/cell 170-2. It is noted that if there are multiple candidate target cells, the UE would select the strongest one. By contrast, if the timer T is not running (block 450=No), the UE 110 performs a beam failure recovery procedure with the serving BS/cell 170-1 in block 460.

Additional examples are as follows.

Example 1. A method, comprising:
determining, by a user equipment and in response to a beam failure being detected for a serving cell that serves the user equipment, whether a timer is running; and
performing one of the following by the user equipment:
performing, in response to the timer running, a beam failure recovery procedure with a target non-serving cell; or
performing, in response to the timer not running, a beam failure recovery procedure with the serving cell.

Example 2. The method of example 1, further comprising:
prior to the determining whether the timer is running, performing the following:
determining by the user equipment whether an entering condition of a measurement event is fulfilled for a time-to-trigger or a second timer for the time-to-trigger has expired, wherein the measurement event is configured at least for the user equipment to measure one or more non-serving cells including the target non-serving cell; and
starting the running of the timer in response to a determination by the user equipment the entering condition of the measurement event is fulfilled for the time-to-trigger or the second timer for the time-to-trigger has expired.

Example 3. The method of example 2, further comprising sending a measurement report in response to the determination by the user equipment the entering condition of the measurement event has been fulfilled for a time-to-trigger or the second timer for time-to-trigger has expired, the measurement report sent to the serving cell and comprising measurements of the one or more non-serving cells.

Example 4. The method of example 1, further comprising:
prior to the determining whether the timer is running, performing the following:
determining by the user equipment whether an entering condition of a measurement event is fulfilled for time-to-trigger or a second timer for the time-to-trigger has expired, wherein the measurement event is configured for the user equipment to measure one or more non-serving cells including the target non-serving cell; and
not starting the running of the timer in response to a determination by the user equipment the entering condition of the measurement event is not fulfilled for the time-to-trigger or the second timer for time-to-trigger has not expired.

Example 5. The method of any of examples 2 to 4, wherein the entering condition of the measurement event being fulfilled comprises an L3 condition for RRC inter-cell mobility being fulfilled.

Example 6. The method of any of examples 1 to 5, where the timer is timer T312.

Example 7. The method of any of examples 1 to 6, where the serving cell and the target non-serving cell are formed by a same base station.

Example 8. The method of any of examples 1 to 7, where the serving cell and the target non-serving cell are formed by two different base stations.

Example 9. The method of any of examples 1 to 8, wherein performing, in response to the timer not running, a beam failure recovery procedure with the serving cell further comprises in response to the timer expiring, performing by the user equipment the beam failure recovery procedure in the same serving cell in response to detecting the beam failure.

Example 10. The method of any of examples 1 to 9, further comprising the user equipment applying, while the timer is running, a different set of synchronization signal/physical broadcast channel blocks and/or channel state information-reference signal candidates for beam failure recovery than that used before the timer is started.

Example 11. The method of any of examples 1 to 10, further comprising, while the timer is running, the user equipment performing beam failure recovery to the target cell in response to a beam failure having been detected in the serving cell and, in a time period while the timer is running, the user equipment performs applying specific values for one or more timers and/or counters that are used in radio link failure detection or beam failure recovery in the target cell.

Example 12. A computer program, comprising code for performing the methods of any of examples 1 to 11, when the computer program is run on a computer.

Example 13. The computer program according to example 12, wherein the computer program is a computer program product comprising a computer-readable medium bearing computer program code embodied therein for use with the computer.

Example 14. The computer program according to example 12, wherein the computer program is directly loadable into an internal memory of the computer.

Example 15. An apparatus, comprising:
  means for determining, by a user equipment and in response to a beam failure being detected for a serving cell that serves the user equipment, whether a timer is running; and
  means for performing one of the following by the user equipment:
  means for performing, in response to the timer running, a beam failure recovery procedure with a target non-serving cell; or
  means for performing, in response to the timer not running, a beam failure recovery procedure with the serving cell.

Example 16. The apparatus of example 15, further comprising:
  means, performed prior to the determining whether the timer is running, for performing the following:
  means for determining by the user equipment whether an entering condition of a measurement event is fulfilled for a time-to-trigger or a second timer for the time-to-trigger has expired, wherein the measurement event is configured at least for the user equipment to measure one or more non-serving cells including the target non-serving cell; and
  means for starting the running of the timer in response to a determination by the user equipment the entering condition of the measurement event is fulfilled for the time-to-trigger or the second timer for the time-to-trigger has expired.

Example 17. The apparatus of example 16, further comprising means for sending a measurement report in response to the determination by the user equipment the entering condition of the measurement event has been fulfilled for a time-to-trigger or the second timer for time-to-trigger has expired, the measurement report sent to the serving cell and comprising measurements of the one or more non-serving cells.

Example 18. The apparatus of example 15, further comprising:
  means, performed prior to the determining whether the timer is running, for performing the following:
  means for determining by the user equipment whether an entering condition of a measurement event is fulfilled for time-to-trigger or a second timer for the time-to-trigger has expired, wherein the measurement event is configured for the user equipment to measure one or more non-serving cells including the target non-serving cell; and
  means for not starting the running of the timer in response to a determination by the user equipment the entering condition of the measurement event is not fulfilled for the time-to-trigger or the second timer for time-to-trigger has not expired.

Example 19. The apparatus of any of examples 16 to 18, wherein the entering condition of the measurement event being fulfilled comprises an L3 condition for RRC inter-cell mobility being fulfilled.

Example 20. The apparatus of any of examples 15 to 19, where the timer is timer T312.

Example 21. The apparatus of any of examples 15 to 20, where the serving cell and the target non-serving cell are formed by a same base station.

Example 22. The apparatus of any of examples 15 to 21, where the serving cell and the target non-serving cell are formed by two different base stations.

Example 23. The apparatus of any of examples 15 to 22, wherein the means for performing, in response to the timer not running, a beam failure recovery procedure with the serving cell further comprises means, responsive to the timer expiring, for performing by the user equipment the beam failure recovery procedure in a same serving cell in response to detecting the beam failure.

Example 24. The apparatus of any of examples 15 to 23, further comprising means for the user equipment applying, while the timer is running, a different set of synchronization signal/physical broadcast channel blocks and/or channel state information-reference signal candidates for beam failure recovery than that used before the timer is started.

Example 25. The apparatus of any of examples 15 to 24, further comprising means, performed while the timer is running, for the user equipment performing beam failure recovery to the target cell in response to a beam failure having been detected in the serving cell and, means, performed in a time period while the timer is running, for the user equipment performing applying specific values for one or more timers and/or counters that are used in radio link failure detection or beam failure recovery in the target cell.

Example 26. An apparatus, comprising:
  one or more processors; and
  one or more memories including computer program code,
  wherein the one or more memories and the computer program code are configured, with the one or more processors, to cause the apparatus to perform operations comprising:
  determining, by a user equipment and in response to a beam failure being detected for a serving cell that serves the user equipment, whether a timer is running; and
  performing one of the following by the user equipment:
  performing, in response to the timer running, a beam failure recovery procedure with a target non-serving cell; or
  performing, in response to the timer not running, a beam failure recovery procedure with the serving cell.

Example 27. The apparatus of example 26, wherein the one or more memories and the computer program code are further configured, with the one or more processors, to cause the apparatus to perform operations comprising:
  prior to the determining whether the timer is running, performing the following:
  determining by the user equipment whether an entering condition of a measurement event is fulfilled for a time-to-trigger or a second timer for the time-to-trigger has expired, wherein the measurement event is configured at least for the user equipment to measure one or more non-serving cells including the target non-serving cell; and
  starting the running of the timer in response to a determination by the user equipment the entering condition of the measurement event is fulfilled for the time-to-trigger or the second timer for the time-to-trigger has expired.

Example 28. The apparatus of example 27, wherein the one or more memories and the computer program code are further configured, with the one or more processors, to cause the apparatus to perform operations comprising: sending a measurement report in response to the determination by the user equipment the entering condition of the measurement event has been fulfilled for a time-to-trigger or the second timer for time-to-trigger has expired, the measurement report sent to the serving cell and comprising measurements of the one or more non-serving cells.

Example 29. The apparatus of example 26, wherein the one or more memories and the computer program code are further configured, with the one or more processors, to cause the apparatus to perform operations comprising:
  prior to the determining whether the timer is running, performing the following:
  determining by the user equipment whether an entering condition of a measurement event is fulfilled for time-to-trigger or a second timer for the time-to-trigger has expired, wherein the measurement event is configured for the user equipment to measure one or more non-serving cells including the target non-serving cell; and
  not starting the running of the timer in response to a determination by the user equipment the entering condition of the measurement event is not fulfilled for the time-to-trigger or the second timer for time-to-trigger has not expired.

Example 30. The apparatus of any of examples 27 to 29, wherein the entering condition of the measurement event being fulfilled comprises an L3 condition for RRC inter-cell mobility being fulfilled.

Example 31. The apparatus of any of examples 26 to 30, where the timer is timer T312.

Example 32. The apparatus of any of examples 26 to 31, where the serving cell and the target non-serving cell are formed by a same base station.

Example 33. The apparatus of any of examples 26 to 32, where the serving cell and the target non-serving cell are formed by two different base stations.

Example 34. The apparatus of any of examples 26 to 33, wherein performing, in response to the timer not running, a beam failure recovery procedure with the serving cell further comprises in response to the timer expiring, performing by the user equipment the beam failure recovery procedure in a same serving cell in response to detecting the beam failure.

Example 35. The apparatus of any of examples 26 to 34, wherein the one or more memories and the computer program code are further configured, with the one or more processors, to cause the apparatus to perform operations comprising: the user equipment applying, while the timer is running, a different set of synchronization signal/physical broadcast channel blocks and/or channel state information-reference signal candidates for beam failure recovery than that used before the timer is started.

Example 36. The apparatus of any of examples 26 to 35 wherein the one or more memories and the computer program code are further configured, with the one or more processors, to cause the apparatus to perform operations comprising: while the timer is running, the user equipment performing beam failure recovery to the target cell in response to a beam failure having been detected in the serving cell and, in a time period while the timer is running, the user equipment performing applying specific values for one or more timers and/or counters that are used in radio link failure detection or beam failure recovery in the target cell.

Example 37. A computer program product comprising a computer-readable storage medium bearing computer program code embodied therein for use with a computer, the computer program code comprising:
  code for determining, by a user equipment and in response to a beam failure being detected for a serving cell that serves the user equipment, whether a timer is running; and
  code for performing one of the following by the user equipment:
  code for performing, in response to the timer running, a beam failure recovery procedure with a target non-serving cell; or
  code for performing, in response to the timer not running, a beam failure recovery procedure with the serving cell.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    determining, by a user equipment and in response to a beam failure being detected for a serving cell that serves the user equipment, whether a timer is running;
    performing one of the following by the user equipment:
        in response to the timer running, a beam failure recovery procedure with a target non-serving cell; or
        in response to the timer not running, a beam failure recovery procedure with the serving cell, and
    prior to the determining whether the timer is running,
        determining by the user equipment whether an entering condition of a measurement event is fulfilled for a time-to-trigger or a second timer for the time-to-trigger has expired, wherein the measurement event is configured at least for the user equipment to measure one or more non-serving cells including the target non-serving cell; and
        starting the running of the timer in response to a determination by the user equipment the entering condition of the measurement event is fulfilled for the time-to-trigger or the second timer for the time-to-trigger has expired.

2. The method of claim 1, further comprising sending a measurement report in response to the determination by the user equipment the entering condition of the measurement event has been fulfilled for a time-to-trigger or the second timer for time-to-trigger has expired, the measurement report sent to the serving cell and comprising measurements of the one or more non-serving cells.

3. The method of claim 1, wherein the entering condition of the measurement event being fulfilled comprises an L3 condition for radio resource control inter-cell mobility being fulfilled.

4. An apparatus, comprising:
    one or more processors; and
    one or more memories including computer program code,
    wherein the one or more memories and the computer program code are configured, with the one or more processors, to cause the apparatus to:
    determine, in response to a beam failure being detected for a serving cell that serves the apparatus, whether a timer is running; and
    perform one of the following:
    in response to the timer running, a beam failure recovery procedure with a target non-serving cell; or
    in response to the timer not running, a beam failure recovery procedure with the serving cell, wherein
    the one or more memories and the computer program code are further configured, with the one or more processors, to cause the apparatus to:
    prior to the determining whether the timer is running:
    determine whether an entering condition of a measurement event is fulfilled for a time-to-trigger or a second timer for the time-to-trigger has expired, wherein the measurement event is configured at least for the apparatus to measure one or more non-serving cells including the target non-serving cell; and
    start the running of the timer in response to a determination the entering condition of the measurement event is fulfilled for the time-to-trigger or the second timer for the time-to-trigger has expired.

5. The apparatus of claim 4, wherein the one or more memories and the computer program code are further configured, with the one or more processors, to cause the apparatus to send a measurement report in response to the determination the entering condition of the measurement event has been fulfilled for a time-to-trigger or the second timer for time-to-trigger has expired, the measurement report sent to the serving cell and comprising measurements of the one or more non-serving cells.

6. The apparatus of claim 4, wherein the entering condition of the measurement event being fulfilled comprises an L3 condition for radio resource control inter-cell mobility being fulfilled.

* * * * *